July 24, 1951  E. F. NELSON  2,561,402
SPECTACLE TEMPLE
Filed Jan. 24, 1947  2 Sheets-Sheet 1
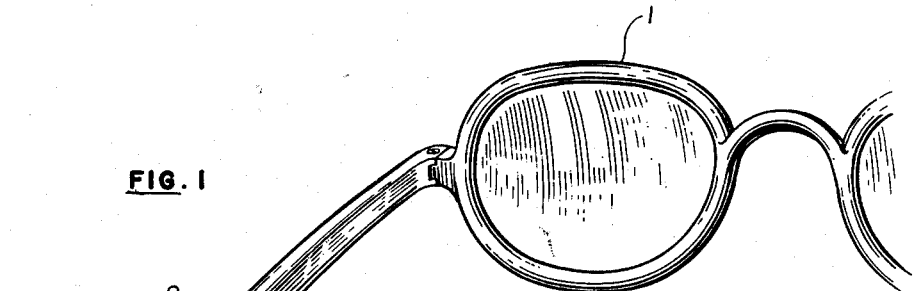
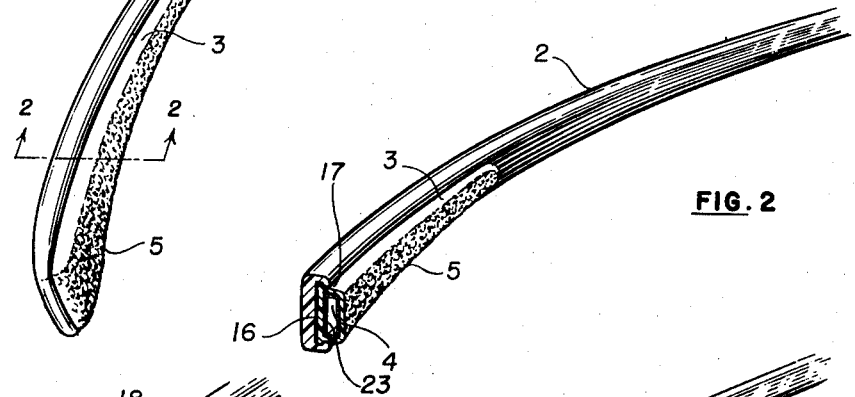
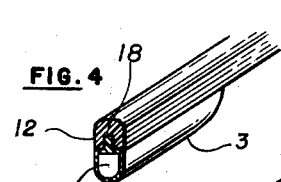
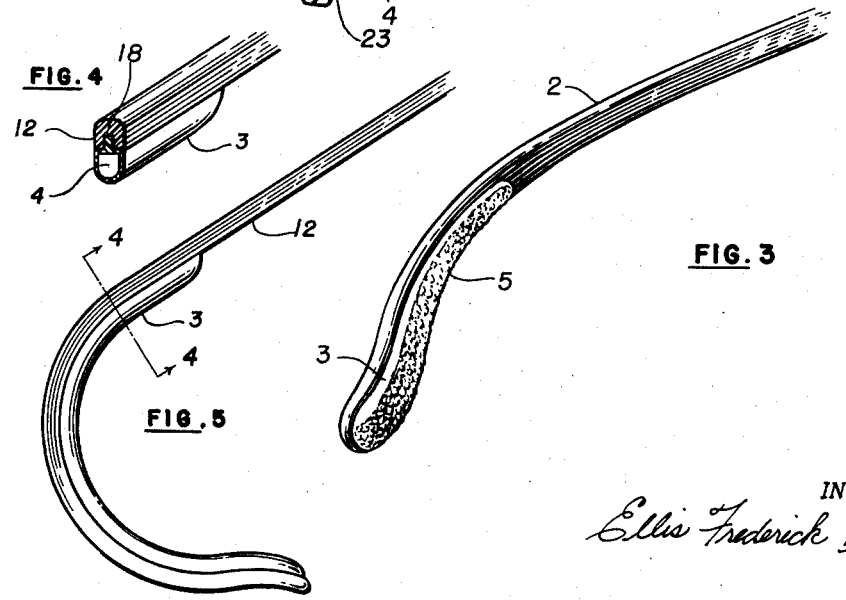
INVENTOR.
Ellis Frederick Nelson

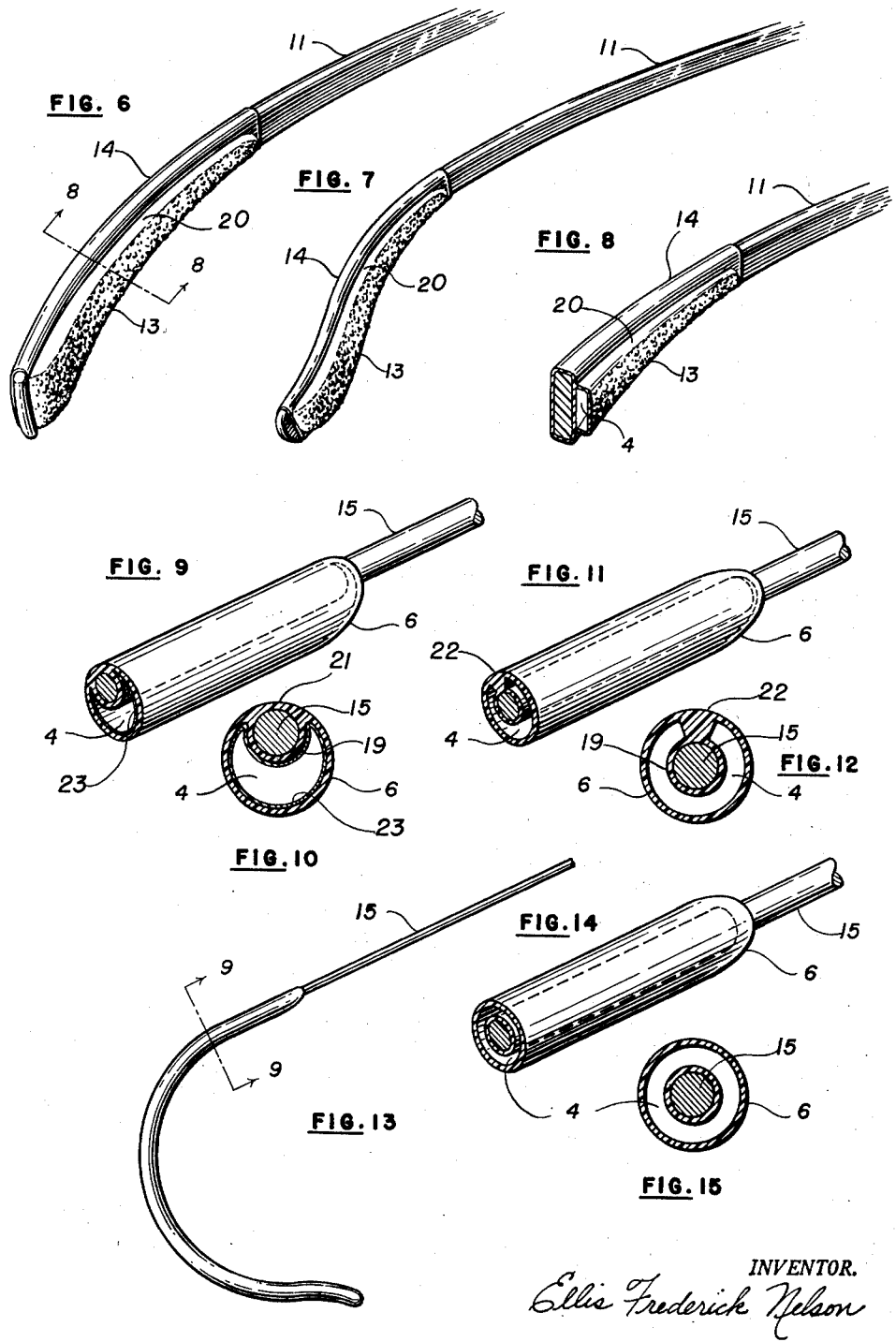

Patented July 24, 1951

2,561,402

UNITED STATES PATENT OFFICE 2,561,402

SPECTACLE TEMPLE

Ellis F. Nelson, Everett, Mass., assignor to E. F. Nelson Company, Inc., Boston, Mass., a corporation of Massachusetts Application January 24, 1947, Serial No. 723,983

17 Claims. (Cl. 88—52)

The present invention relates to ophthalmic mountings or eyeglasses, and more particularly to spectacle temples.

Spectacle temples of the skull type bear against the skull. Those of the curved-ear-hook type bear against the back of the ear and adjacent parts of the head. If the bearing pressure is too great, it is painful; if too loose, the ophthalmic mounting does not remain in proper position upon the face. It is practically impossible, in the great majority of cases, to provide just the right amount of pressure, neither too great nor too small.

The consequence is that, in the case of ophthalmic mountings provided with skull temples, for example, the mounting may shake loose from the head and fall to the floor. To prevent similar happenings in the case of eyeglasses provided with the ear-hook type of temple, the temple is usually adjusted so as to be a little too tight, and rubber or other tubes or other protective members are mounted over the ear hook to relieve the bearing pressure of the temples.

These rubber or other tubes have given some degree of relief, but they have been attended with disadvantages.

A further difficulty resides in the impossibility of so adjusting the temple that its bearing pressure shall be distributed evenly throughout the area of the wearer's skin with which it contacts. The total bearing pressure is usually exerted, on the contrary, upon some localized portion of the skin, which may become abraded, in consequence.

It is accordingly an object of the present invention to provide a new and improved spectacle temple the pressure of which shall automatically so adjust itself as to enable wearing the ophthalmic mounting in comfort, while it is nevertheless held securely in place.

Another object is to provide a new and improved spectacle temple of the skull type.

A further object is to provide a new and improved spectacle temple of the ear-hook type.

Still another object is to provide a new and improved attachment for a spectacle temple of either type, in order to adapt the invention to standard temples.

Other and further objects will be explained hereinafter, and will be particularly pointed out in the appended claims.

The invention will now be more fully described in connection with the accompanying drawings, in which Fig. 1 is a perspective of a skull temple embodying the invention, shown hinged to a spectacle lens frame; Fig. 2 is a fragmentary perspective of the temple, partly in section upon the line 2—2 of Fig. 1, looking in the direction of the arrows; Fig. 3 is a similar non-sectioned fragmentary perspective of a modified skull temple; Fig. 4 is a fragmentary perspective similar to Fig. 2, partly in section upon the line 4—4 of Fig. 5, looking in the direction of the arrows; Fig. 5 is a fragmentary perspective similar to Fig. 3 of an ear-hook temple embodying the invention; Figs. 6 and 7 are fragmentary perspectives of standard skull temples of the types illustrated in Figs. 1 and 3, respectively, but provided with attachments embodying the invention; Figs. 8 and 9 are fragmentary perspective similar to Figs. 2 and 4, respectively, partly in section upon the respective lines 8—8 of Fig. 6 and 9—9 of Fig. 13, looking in the directions of the respective arrows, Fig. 9, however, being upon a larger scale than the scale of Fig. 13; Fig. 10 is a view showing the section of Fig. 9 upon a still larger scale; Fig. 11 is a fragmentary sectional perspective similar to Fig. 9 of a modification; Fig. 12 is a view similar to Fig. 10, showing the section of Fig. 11 upon a larger scale; Fig. 13 is a fragmentary perspective of a standard ear hook temple provided with an attachment embodying the invention; Fig. 14 is a fragmentary sectional perspective similar to Figs. 9 and 11 of still another modification; and Fig. 15 is a view similar to Figs. 10 and 12 showing the section of Fig. 14 upon a larger scale.

In Fig. 1, a left skull temple 2 is shown, hinged at its forward end to a spectacle lens frame 1. The rearward projecting portion of the skull temple 2 is designed to bear against the left side of the skull at the same time that a right skull temple, not shown, bears against the right side of the skull. These skull temples may be constituted of metal or some non-metal material, such as the nitrocellulose products known as "Zylonite" and "Celluloid," consisting of about 40 parts of nitrocellulose, 20 parts camphor and 40 parts linseed or castor oil or equivalents. In either case, they are previously so shaped by the optician that, when occupying their fully opened position, as illustrated in Fig. 1, their rear ends, owing to the resiliency of the material of which the temples are constituted, shall exert sufficient bearing pressure against the sides of the skull to hold the ophthalmic mounting firmly on the face. If this bearing pressure should be too weak, of course, the spectacles would be held loosely, and would tend to fall to the ground upon the wearer inclining his face downward. As it is almost impossible, moreover, to adjust the temples so as to conform exactly to the shape of the individual wearer's skull, the bearing pressure is usually exerted at isolated regions only of the rear ends of the temples, and this concentrated bearing pressure at the isolated regions causes great discomfort.

According to the present invention, however, this bearing pressure is rendered practically unobjectionable by distributing it over a very large area, shown in Fig. 1 as extending over the entire rear half of the temple 2.

To this end, the inner face of the rearward propecting portion of the temple 2 is provided with a one-piece flexible tubular chamber 3, sealed at both ends so as to be fluid-tight, and the space 4 within which contains a fluid. The fluid may be a suitable gas or liquid, including air and water. The chamber 3 is shown as extending lengthwise of the rearward projecting portion of the temple 2 and, like the temple itself, is narrower at its forward end than at its rear end. The skull temple 2 shown in Fig. 3 is narrower than that shown in Fig. 1, and more curved. The tubular chamber, in both instances, conforms to the shape of the rearward projecting portion of the temple 2.

At least the exposed outer wall or face of the tubular chamber 3, that engages the side of the skull, is flexible, in order that it may conform throughout its area to the shape of the side of the skull against which it contacts. Since this wall or face 5 directly engages the skull, the pressure exerted thereby becomes distributed throughout the area of engagement of the skull by the flexible skull-engaging wall or face 5 of the tube 3.

A similar effect may be obtained with the type of temple 2, illustrated in Fig. 5, the rearward projecting portion of which is curved into the shape of a hook. The bearing pressure behind the ear and against adjacent areas of the head becomes distributed throughout the areas of engagement by providing the curved rearward projecting hook portion of the temple 12 with a correspondingly curved fluid-containing chamber 3.

In both cases, a uniform distribution of bearing pressure is obtained, such as is not attainable with previously proposed constructions involving, for example, the use of solid rubber or other tubes slipped over the rear end of the temple. Though the solid rubber may be softer than the metal or the nitrocellulose products before mentioned of which the temple is constituted, it nevertheless provides a solid bearing surface. According to the present invention, on the other hand, the only solid that bears against any part of the wearer's body is the face or wall 5 of the tubular chamber 3, and this face or wall 5 may be made so thin and flexible as not to prevent any real solid reaction at all. Substantially the whole reaction is provided by the fluid in the space 4.

The tubular chamber 3 may be assembled with the temple in any desired way. As shown in Fig. 2, it may be cemented in place along its inner wall in a recess 16 provided with flanges 17. As shown in Fig. 4, it may be cemented in an unflanged recess 18. It is possible, indeed, to manufacture the temple, if of non-metal material, in one piece with the tubular chamber 5. Suitable materials for this purpose will be described hereinafter.

The invention is not, however, restricted to use with specially designed temples. It may be used also with standard temples, as will appear from Figs. 6 to 15.

The skull temples 11 of Figs. 6 and 7, of the same shape, respectively, as illustrated in Figs. 1 and 3, are shown provided with attachments comprising tubular holders 14 each carrying a sealed fluid-tight tubular fluid-containing chamber 20 of the same nature as the tubular chamber 3 already described. The exposed outer wall or face 13 of the chamber 20 is of the same nature as the exposed wall or face 5 of the chamber 3. The holder 14 is provided along the inner wall of the chamber 20 with an elongated recess additional to the chamber 20 for receiving the rearward projecting portion of the temple, as illustrated. The tubular chamber 20 and the tubular holder 14 may be made in one piece, of the same flexible material; or, if a greater or less degree of flexibility is desired for the tubular holder 14 than for the tubular chamber 20, they may be made of different materials.

The ear-hook temple 15 of Figs. 9 to 15 may be provided with a similar attachment. The attachment may comprise a tubular holder 19, corresponding to the tubular holder 14, conforming in shape to the shape of the rear end of the ear-hook temple 15, and a sealed fluid-tight tubular fluid-containing chamber 6, corresponding to the fluid-containing chamber 3. It is preferred, in this case, to have the curved or hook-shaped tubular holder 19, with the rearward projecting portion of the temple 15 disposed therein, inside the tubular fluid-containing chamber 6. The sealed fluid-containing space 4 between them is disposed, however, adjacent to the bearing surface behind the ear and next to the adjacent bearing surfaces of the head. The fluid-containing chamber 4 is thus provided with inner and outer walls 19 and 6, the rearward projecting portion of the temple 15 being disposed in the elongated recess provided by the inner wall 19.

Several different forms of this embodiment of the attachment are illustrated. According to the embodiment shown in Figs. 9 and 10, the tubular holder 19 and the tubular fluid-containing chamber 6 are merged in a common tangentially disposed wall 21. The tubular holder 19 and the tubular fluid-containing chamber 6 may, however, be separated from each other by a longitudinally extending wall 22, as shown in Figs. 11 and 12. By means of this expedient, it is possible to position the tubular holder 19 centrally of the tubular fluid-containing chamber 6. The advantage is thereby attained that the fluid-containing space 4 extends farther up along the two side walls of the fluid-containing chamber than is the case with the embodiment illustrated in Figs. 9 and 10. It is perfectly feasible, however, to have the tubular holder 19 and the tubular fluid-containing chamber 6 entirely unconnected except at their forward and rear ends, at the points where the fluid-containing tubular chamber 6 is sealed, as illustrated by Figs. 14 and 15. Though the lower wall of the fluid-containing chamber 19 may, in that case, contact with the lower wall of the tubular chamber 6, these walls are free to slip with respect to each other, with a fluid layer between them. In most cases, therefore, the same distributed pressure may be obtained with the modification as with the other described embodiments of the invention.

The flexible body-engaging walls of the tubular fluid-containing chambers 3 and 20 may be constituted of any suitable flexible material. Rubber, however, has certain disadvantages. It becomes disintegrated by perspiration, body oils and other secretions, and even by mere exposure to variations in the condition of the atmosphere, temperature and sunlight. With disintegration, it loses its resiliency, and also its waterproofing and airproofing properties, permitting the gas or liquid in the tubular chamber to escape. Continued contact of rubber with the skin, moreover, may lead to pathological consequences.

It is therefore preferred to employ a suitable flexible plastic, such as a plasticized vinyl resin polymer. This may, for example, be the product obtained by polymerizing one or two or more vinyl derivatives; for example, a vinyl halide, such as vinyl chloride, and a vinyl ester of an aliphatic acid, such as vinyl acetate, propionate or butyrate, or a styrene compound. Vinyl chloride, is preferred, without the vinyl acetate, because it is non-toxic, but a conjoint copolymer of both these compounds may be used.

To impart the proper degree of flexibility, the vinyl chloride, with or without the vinyl acetate, for example, should be combined with a suitable plasticizer, such as a neutral high-boiling ester of phosphoric acid, like tricresyl phosphate, or of phthalic acid, like dibutyl, dibutoxyethyl or ethylhexyl phthalate, a sebacate, an alkylated or halogenated napthalene or diphenyl, or a polymeric glycol ester, like triglycol dihexoate.

The proportions of the ingredients should be such as to yield a product that not only is flexible, but also has the toughness and strength necessary to resist tearing and abrasion. It should, furthermore, have suitable waterproofing and airproofing properties, so as to offer high resistance to the permeation of gases. These properties vary, of course, with the particular polymers and plastics and proportions employed. The product should have characteristics such as to resist the destructive action of oxidation, oils and sunlight, and of corrosives such as acids and alkalis. To reduce toxicity, it should preferably be purified.

Commercial resins admirably adapted for the purpose are on sale under the trade-marks, for example, Koroseal and Vinylite Q, the former manufactured by the B. F. Goodrich Company, and the latter by the Carbon and Carbide Company.

The following proportions have been found to be quite satisfactory:

100 parts of the resin, by weight;
35 parts ±10 parts of the plasticizer, by weight; and
Approximately 5 parts by weight of one or more stabilizers, pigments, fillers, modifiers, etc.

Among the resins that may be employed in accordance with the present invention are the following:

Cellulose acetate compositions; cellulose acetate butyrate compositions; cellulose nitrate plastics; ethyl and methyl cellulose plastics; methyl methacrylate molding materials; polyethylene plastics; polystyrene; polyvinyl acetals, formals and butyrals; polyvinyl chloride plastics; polyvinylidene chloride; vinyl chloride-acetate resin compounds; vinylidene chloride plastics; chlorinated rubber; polyamide molding materials; regenerated cellulose; tetrafluorethylene; butadiene copolymers; chloroprene polymers; isobutene polymers; isobutene-diolefin copolymers; vinyl polymers; styrene elastomers; polyester elastomers; cyclorubber; siliconerubber; and organic polysulfides. These may be employed singly or in combination; as, for example, a combination of styrene and butadiene. Some of these, of course, are better than others.

All of the above compounds may be made flexible by suitable treatment, as by including or excluding plasticizers, and the like. In some cases, indeed, as in the case of the polyethylene plastics, not even a plasticizer is needed. This list is by no means complete, moreover; reference may be made, for example, to the odorless, tasteless, non-toxic protein obtained from corn raw material of the casein type and manufactured under the name "Zein" by the Corn Products Refining Company and the unsaturable rubber-like vegetable-oil-compound polymer made from soy beans and ethyl alcohol, known as "Agripol," marketed by Reichhold Chemical Company.

To reduce the tendency for air or other gases to permeate through the walls of the chamber, the inner faces of these walls may be coated, as shown at 23, with a solution of a polyvinyl alcohol polymer. This coating may be supplied in any desired manner, as by spraying, painting or dipping.

The flexible fluid-containing tubular chamber need not, however, be constituted entirely of the plasticized polymer, and it need not be of uniform constitution or thickness. It is sufficient that the face or wall that engages a part of the wearer's body, like the wall or face 5 or 13, be so constituted, and that it be of the proper thinness to impart the proper degree of flexibility to enable it to conform to the surface of the skin with which it engages.

Further modifications will occur to persons skilled in the art, and all such are considered to fall within the spirit and scope of the invention, as defined in the appended claims.

What is claimed is:

1. A skull-engaging or ear-engaging pad for attachment to a spectacle temple comprising a fluid-tight, fluid-containing tubular chamber having an inner wall and an outer wall for engaging the skull or behind the ear, the pad being provided along its inner wall with an elongated recess additional to the chamber for receiving the rearward projecting portion of the temple, and the material of the outer wall of the chamber being of sufficient flexibility to conform yieldingly to the shape of all parts of the skull or the ear with which it engages, throughout the area of such engagement, in order that the pressure of the fluid in the chamber behind the said outer wall shall be distributed evenly throughout the said area of engagement.

2. A skull-engaging or ear-engaging pad for attachment to a spectacle temple comprising a fluid-tight, fluid-containing tubular chamber having an inner wall and an outer wall for engaging the skull or behind the ear, the pad being provided along its inner wall with an elongated recess additional to the chamber for receiving the rearward projecting portion of the temple, and the material of the outer wall of the chamber comprising a plasticized substance of sufficient flexibility to conform yieldingly to the shape of all parts of the skull or the ear with which it engages, throughout the area of such engagement, in order that the pressure of the fluid in the chamber behind the said outer wall shall be distributed evenly throughout the said area of engagement.

3. A skull-engaging or ear-engaging pad for attachment to a spectacle temple comprising a fluid-tight, fluid-containing tubular chamber having an inner wall and an outer wall for engaging the skull or behind the ear, the pad being provided along its inner wall with an elongated recess additional to the chamber for receiving the rearward projecting portion of the temple, and the material of the outer wall of the chamber comprising a plasticized vinyl resin polymer of sufficient flexibility to conform yieldingly to the shape of all parts of the skull or the ear with which it engages, throughout the area of such engagement, in order that the pressure of the fluid in the chamber behind the said outer wall shall be distributed evenly throughout the said area of engagement.

4. A skull-engaging or ear-engaging pad for attachment to a spectacle temple comprising a fluid-tight, fluid-containing tubular chamber having an inner wall and an outer wall for engaging the skull or behind the ear, the pad being provided with an elongated recess additional to the chamber for receiving the rearward projecting portion of the temple, and the material of the outer wall of the chamber comprising a plasticized chloroprene polymer of sufficient flexibility to conform yieldingly to the shape of all parts of the skull or the ear with which it engages, throughout the area of such engagement, in order that the pressure of the fluid in the chamber behind the said outer wall shall be distributed evenly throughout the said area of engagement.

5. A skull-engaging or ear-engaging pad for attachment to a spectacle temple comprising a fluid-tight, fluid-containing tubular chamber having an inner wall and an outer wall for engaging the skull or behind the ear, the pad being provided with an elongated recess additional to the chamber for receiving the rearward projecting portion of the tempde, and the material of the outer wall of the chamber comprising a plasticized isobutene-diolefin copolymer of sufficient flexibility to conform yieldingly to the shape of all parts of the skull or the ear with which it engages, throughout the area of such engagement, in order that the pressure of the fluid in the chamber behind the said outer wall shall be distributed evenly throughout the said area of engagement.

6. A spectacle temple having means for connection to a lens-holding member at its forward end, a rearward projecting portion, and a fluid-tight fluid-containing chamber mounted exteriorly of the rearward projecting portion having a soft yieldable wall of substantial area for engaging a portion of corresponding substantial area of the skull or behind the ear and the material of which comprises a substance selected from the group consisting of a plasticized chloroprene polymer, a plasticized isobutene-diolefin copolymer, a plasticized vinyl halide polymer, a plasticized silicon rubber and a polyethylene plastic, whereby the soft yieldable wall is rendered non-toxic, the substance being treated to render it of sufficient flexibility to conform yieldingly to the shape of all parts of the said area of the skull or behind the ear with which it engages throughout the said area of such engagement in order that the pressure of the fluid in the chamber behind the wall shall be distributed evenly throughout the said area of engagement, whereby substantially the whole reaction against the said area of the skull or behind the ear is provided through the wall by the fluid in the chamber without substantial solid reaction by the wall against the said area of the skull or behind the ear.

7. A spectacle temple having means for connection to a lense-holding member at its forward end, a rearward projecting portion, and a fluid-tight fluid-containing chamber mounted exteriorly of the rearward projecting portion having a soft yieldable wall of substantial area for engaging a portion of corresponding substantial area of the skull or behind the ear and the material of which comprises a plasticized silicon rubber, whereby the soft yieldable wall is rendered non-toxic, the silicon rubber being treated to render it of sufficient flexibility to conform yieldingly to the shape of all parts of the said area of the skull or behind the ear with which it engages throughout the said area of such engagement in order that the pressure of the fluid in the chamber behind the wall shall be distributed evenly throughout the said area of engagement, whereby substantially the whole reaction against the said area of the skull or behind the ear is provided through the wall by the fluid in the chamber without substantial solid reaction by the wall against the said area of the skull or behind the ear.

8. A spectacle temple having means for connection to a lens-holding member at its forward end, a rearward projecting portion, and a fluid-tight fluid-containing chamber mounted exteriorly of the rearward projecting portion having a soft yieldable wall of substantial area for engaging a portion of corresponding substantial area of the skull or behind the ear and the material of which comprises a polyethylene plastic, whereby the soft yieldable wall is rendered non-toxic, the polyethylene plastic being treated to render it of sufficient flexibility to conform yieldingly to the shape of all parts of the said area of the skull or the ear with which it engages throughout the said area of such engagement in order that the pressure of the fluid in the chamber behind the wall shall be distributed evenly throughout the said area of engagement, whereby substantially the whole reaction against the said area of the skull or behind the ear is provided through the wall by the fluid in the chamber without substantial solid reaction by the wall against the said area of the skull or behind the ear.

9. In a spectacle temple having means for connection to a lens-holding member at its forward end and a rearward projecting portion, a skull-engaging or ear-engaging pad for attachment to the temple provided with means for mounting it upon the rearward projecting portion of the temple and with a fluid-tight fluid-containing chamber additional to the said means having a soft yieldable wall of substantial area for engaging a portion of corresponding substantial area of the skull or behind the ear and the material of which comprises a substance selected from the group consisting of a plasticized chloroprene polymer, a plasticized isobutene-diolefin copolymer, a plasticized vinyl halide polymer, a plasticized silicon rubber and a polyethylene plastic, whereby the soft yieldable wall is rendered non-toxic, the polyethylene plastic being treated to render it of sufficient flexibility to conform yieldingly to the shape of all parts of the said area of the skull or behind the ear with which it engages throughout the said area of such engagement in order that the pressure of the fluid in the chamber behind the wall shall be distributed evenly throughout the said area of engagement, whereby substantially the whole reaction against the said area of the skull or behind the ear is provided through the wall by the fluid in the chamber without substantial solid reaction by the wall against the said area of the skull or behind the ear.

10. In a spectacle temple having means for connection to a lens-holding member at its forward end and a rearward projecting portion, a skull-engaging or ear-engaging pad for attachment to the temple provided with means for mounting it upon the rearward projecting portion of the temple and with a fluid-tight fluid-containing chamber additional to the said means having a soft yieldable wall of substantial area for engaging a portion of corresponding substantial area of the skull or behind the ear and the material of which comprises a plasticized silicon rubber, whereby the soft yieldable wall is rendered non-toxic, the silicon rubber being treated to render it of sufficient flexibility to conform yieldingly to the shape of all parts of the said area of the skull or behind the ear with which it engages throughout the said area of such engagement in order that the pressure of the fluid in the chamber behind the wall shall be distributed evenly throughout the said area of engagement, whereby substantially the whole reaction against the said area of the skull or behind the ear is provided through the wall by the fluid in the chamber without substantial solid reaction by the wall against the said area of the skull or behind the ear.

11. In a spectacle temple having means for connection to a lens-holding member at its forward end and a rearward projecting position, a skull-engaging or ear-engaging pad for attachment to the temple provided with means for mounting it upon the rearward projecting portion of the temple and with a fluid-tight fluid-containing chamber additional to the said means having a soft yieldable wall of substantial area for engaging a portion of corresponding substantial area of the skull or behind the ear and the material of which comprises a polyethylene plastic, whereby the soft yieldable wall is rendered non-toxic, the polyethylene plastic being treated to render it of sufficient flexibility to conform yieldingly to the shape of all parts of the said area of the skull or behind the ear with which it engages throughout the said area of such engagement in order that the pressure of the fluid in the chamber behind the wall shall be distributed evenly throughout the said area of engagement, whereby substantially the whole reaction against the said area of the skull or behind the ear is provided through the wall by the fluid in the chamber without substantial solid reaction by the wall against the said area of the skull or behind the ear.

12. A spectacle temple having means for connection to a lens-holding member at its forward end, a rearward projecting portion and a fluid-tight fluid-containing chamber mounted exteriorly of the rearward projecting portion having a soft yieldable wall of substantial area for engaging a portion of corresponding substantial area of the skull or behind the ear and the material of which comprises a plasticized vinyl halide polymer, whereby the soft yieldable wall is rendered non-toxic, the vinyl halide being treated to render it of sufficient flexibility to conform yieldingly to the shape of all parts of the said area of the skull or behind the ear with which it engages throughout the said area of such engagement in order that the pressure of the fluid in the chamber behind the wall shall be distributed evenly throughout the said area of engagement, whereby substantially the whole reaction against the said area of the skull or behind the ear is provided through the wall by the fluid in the chamber without substantial solid reaction by the wall against the said area of the skull or behind the ear.

13. A spectacle temple having means for connection to a lens-holding member at its forward end, a rearward projecting portion, and a fluid-tight fluid-containing chamber mounted exteriorly of the rearward projecting portion having a soft yieldable wall of substantial area for engaging a portion of corresponding substantial area of the skull or behind the ear and the material of which comprises a plasticized chloroprene polymer, whereby the soft yieldable wall is rendered non-toxic, the chloroprene polymer being treated to render it of sufficient flexibility to conform yieldingly to the shape of all parts of the said area of the skull or behind the ear with which it engages throughout the said area of such engagement in order that the pressure of the fluid in the chamber behind the wall shall be distributed evenly throughout the said area of engagement, whereby substantially the whole reaction against the said area of the skull or behind the ear is provided through the wall by the fluid in the chamber without substantial solid reaction by the wall against the said area of the skull or behind the ear.

14. A spectacle temple having means for connection to a lens-holding member at its forward end, a rearward projecting portion and a fluid-tight fluid-containing chamber mounted exteriorly of the rearward projecting portion having a soft yieldable wall of substantial area for engaging a portion of corresponding substantial area of the skull or behind the ear and the material of which comprises a plasticized isobutene-diolefin copolymer, whereby the soft yieldable wall is rendered non-toxic, the isobutene-diolefin copolymer being treated to render it of sufficient flexibility to conform yieldingly to the shape of all parts of the said area of the skull or behind the ear with which it engages throughout the said area of such engagement in order that the pressure of the fluid in the chamber behind the wall shall be distributed evenly throughout the said area of engagement, whereby substantially the whole reaction against the said area of the skull or behind the ear is provided through the wall by the fluid in the chamber without substantial solid reaction by the wall against the said area of the skull or behind the ear.

15. In a spectacle temple having means for connection to a lens-holding member at its forward end and a rearward projecting portion, a skull-engaging or ear-engaging pad for attachment to the temple provided with means for mounting it upon the rearward-projecting portion of the temple and with a fluid-tight fluid-containing chamber additional to the said means having a soft yieldable wall of substantial area for engaging a portion of corresponding substantial area of the skull or behind the ear and the material of which comprises a plasticized vinyl halide polymer, whereby the soft yieldable wall is rendered non-toxic, the vinyl halide polymer being treated to render it of sufficient flexibility to conform yieldingly to the shape of all parts of the said area of the skull or behind the ear with which it engages throughout the said area of such engagement in order that the pressure of the fluid in the chamber behind the wall shall be distributed evenly throughout the said area of engagement, whereby substantially the whole reaction against the said area of the skull or behind the ear is provided through the wall by the fluid in the chamber without substantial solid reaction by the wall against the said area of the wearer's head.

16. In a spectacle temple having means for connection to a lens-holding member at its forward end and a rearward projecting portion, a skull-engaging or ear-engaging pad for attachment to the temple provided with means for mounting it upon the rearward-projecting portion of the temple and with a fluid-tight fluid-containing chamber additional to the said means having a soft yieldable wall of substantial area for engaging a portion of corresponding substantial area of the skull or behind the ear and the material of which comprises a plasticized chloroprene polymer, whereby the soft yieldable wall is rendered non-toxic, the chloroprene polymer being treated to render it of sufficient flexibility to conform yieldingly to the shape of all parts of the said area of the skull or behind the ear with which it engages throughout the said area of such engagement in order that the pressure of the fluid in the chamber behind the wall shall be distributed evenly throughout the said area of engagement, whereby substantially the whole reaction against the said area of the skull or behind the ear is provided through the wall by the fluid in the chamber without substantial solid reaction by the wall against the said area of the wearer's head.

17. In a spectacle temple having means for connection to a lens-holding member at its forward end and a rearward projecting portion, a skull-engaging or ear-engaging pad for attachment to the temple provided with means for mounting it upon the rearward-projecting portion of the temple and with a fluid-tight fluid-containing chamber additional to the said means having a soft yieldable wall of substantial area for engaging a portion of corresponding substantial area of the skull or behind the ear and the material of which comprises a plasticized isobutene-diolefin copolymer, whereby the soft yieldable wall is rendered non-toxic, the isobutene-diolefin copolymer being treated to render it of sufficient flexibility to conform yieldingly to the shape of all parts of the said area of the skull or behind the ear with which it engages throughout the said area of such engagement in order that the pressure of the fluid in the chamber behind the wall shall be distributed evenly throughout the said area of engagement, whereby substantially the whole reaction against the said area of the skull or behind the ear is provided through the wall by the fluid in the chamber without substantial solid reaction by the wall against the said area of the wearer's head.

ELLIS F. NELSON.

REFERENCES CITED

The following references are of record in the file of this patent:

UNITED STATES PATENTS

| Number | Name | Date |
| --- | --- | --- |
| D. 69,435 | Bobrow | Feb. 16, 1926 |
| 585,119 | Parker | June 22, 1897 |
| 604,770 | Lieb | May 31, 1898 |
| 704,714 | Laforest | July 15, 1902 |
| 989,397 | Neudorff | Apr. 11, 1911 |
| 1,496,560 | Spyer | June 3, 1924 |
| 1,524,321 | Stevens et al. | Jan. 27, 1925 |
| 1,555,928 | Morrissey | Oct. 6, 1925 |
| 1,806,464 | Housley | May 19, 1931 |
| 2,032,843 | Grier | Mar. 3, 1936 |
| 2,162,678 | Robertson | June 13, 1939 |
| 2,259,080 | Ring | Oct. 14, 1941 |
| 2,259,082 | Ring | Oct. 14, 1941 |
| 2,436,101 | Dirlam et al. | Feb. 17, 1948 |

FOREIGN PATENTS

| Number | Country | Date |
| --- | --- | --- |
| 6,127 | Great Britain | of 1894 |